Oct. 19, 1965  G. A. HENDERSON  3,212,724
SCRAP DISINTEGRATOR FOR CIRCULAR SAW
Filed Aug. 2, 1963
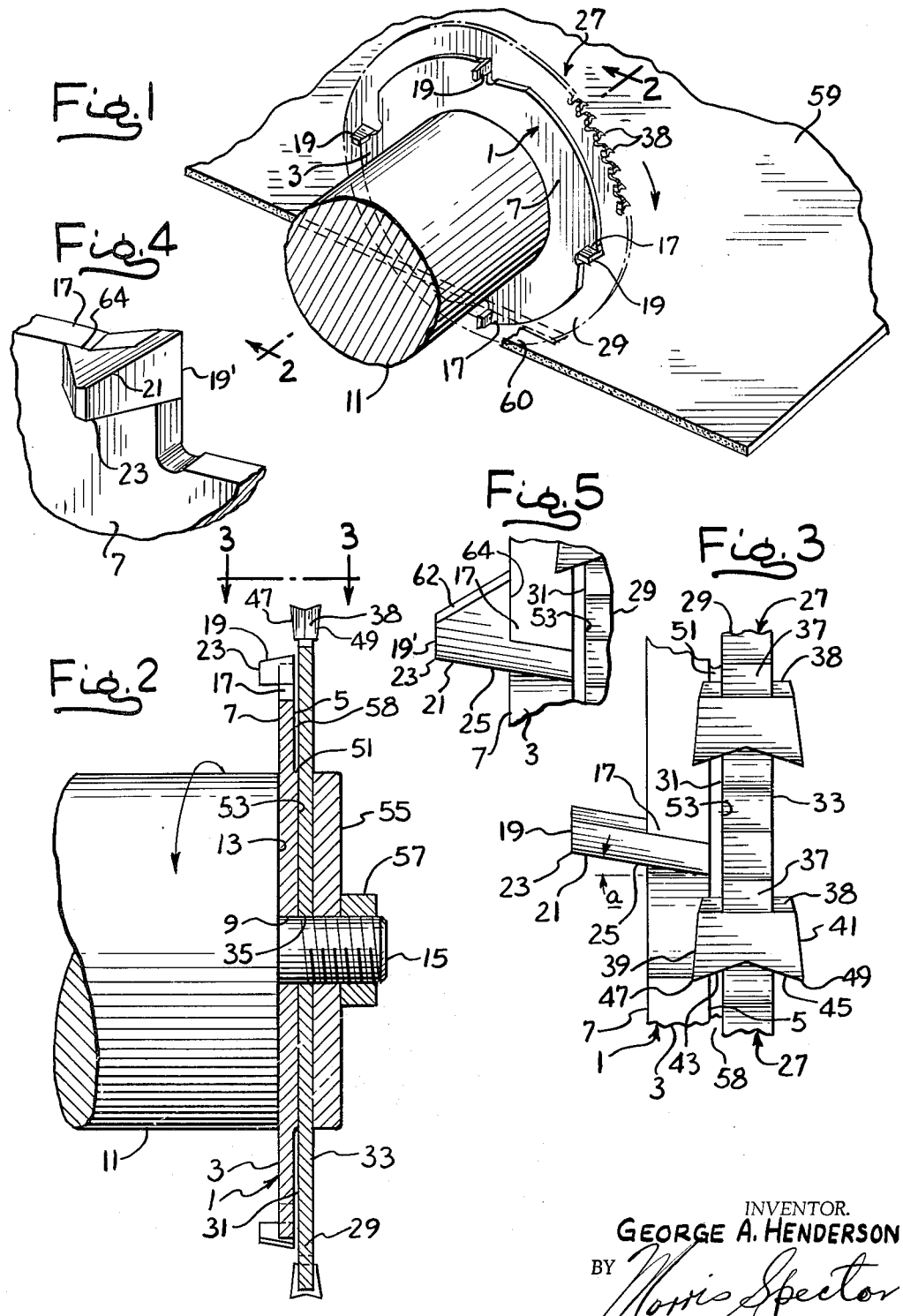
INVENTOR.
GEORGE A. HENDERSON
BY Morris Spector
ATTY.

United States Patent Office 3,212,724
Patented Oct. 19, 1965

3,212,724
SCRAP DISINTEGRATOR FOR CIRCULAR SAW
George A. Henderson, 1807 N. California Ave., Chicago, Ill.
Filed Aug. 2, 1963, Ser. No. 299,523
6 Claims. (Cl. 241—277)

This invention relates in general to sawing, and more particularly to a scrap disintegrator for use with a circular saw.

It is an object of the present invention to provide a scrap disintegrator that is mounted on a saw arbor adjacent to a circular saw so as to break up into small particles the scrap or trim pieces left by the saw as the latter performs its sawing operation, thereby to enable the particles to be easily removed from the region of the saw by a blower or other suitable collector.

It is a further object of the present invention to provide a scrap disintegrator of the type stated which is so constructed and so mounted on the saw arbor in relation to the saw whereby the scrap disintegrator does not cause axial distortion of the saw body and thus alter the accuracy of the saw cut.

It is also an object of the present invention to provide a scrap disintegrator of the type stated having a plurality of peripheral teeth each of which has a shear face angle so that the disintegrator breaks up the scrap primarily with a cutting action rather than hammering or impact action.

The attainment of the above and further objects of the present invention will be apparent from the following specification taken in conjunction with the accompanying drawing forming a part thereof.

In the drawing:

FIG. 1 is a fragmentary perspective view of a scrap disintegrator constructed in accordance with and embodying the present invention, the scrap disintegrator and circular saw each being mounted on a saw arbor;

FIG. 2 is a fragmentary sectional view on an enlarged scale taken along line 2—2 of FIG. 1;

FIG. 3 is a fragmentary top plan view, on an enlarged scale, as seen from line 3—3 in FIG. 2;

FIG. 4 is a fragmentary perspective view of the disintegrator having a modified form of tooth; and FIG. 5 is a view similar to FIG. 3, of the disintegrator of FIG. 4 assembled on a saw arbor with the saw.

Referring now in more detail and by reference characters to the drawing, which illustrates the preferred embodiment of the present invention, 1 designates a scrap disintegrator which comprises a tempered steel, flat- disc-like body 3 having opposed sides 5, 7 which are perpendicular to the axis of rotation of the body 3. Formed in the body 3 is a hole 9, concentric with the axis of rotation of the body 3, by which the body 3 may be mounted on the saw arbor 11 of the machine that drives the scrap disintegrator 1 and the hereinafter described circular saw. The arbor 11 includes an axially presented abutment 13 for flush fitting reception with the disintegrator side 7, and an axially extending threaded stud 15 that is removably received in the hole 9.

The body 3 is substantially greater in diameter than the abutment 13, and the outer periphery of the body 3 is formed with circumferentially spaced tooth-backing elements 17 for supporting disintegrator tips or teeth 19, which may be of a suitable tungsten carbide steel. The teeth 19 are brazed or otherwise suitably secured to the respective backing elements 17, and all of the teeth 19 project a substantial distance laterally beyond the body side 7. The projected or overhanging part of each tooth may be greater than the width of the body 3. Preferably the teeth 19 do not project laterally of the body side 5 but are ground flush therewith. The teeth are identical and each has cutting edges 21, 23 which form surfaces of revolution. Each tooth also has a front face 25 that intersects the cutting edges 21, 23 and forms an acute shear face angle $a$, as shown in FIG. 3.

Also mounted on the saw arbor 11 is a circular saw 27 which may be of a type suitable for the stock material and sawing operation. By way of example, trimmer saws of the "right" or "left" type, as the case may require, may be used. Also, the type of saw disclosed in my copending application Serial No. 259,805, filed February 20, 1963, and to which reference may be had, may be used. A saw of the latter type comprises a tempered steel, balanced, flat, disc-like saw body 29 having opposite parallel sides 31, 33 which are perpendicular to the axis of rotation of the saw arbor. The saw body 29 has a hole 35, coaxial with the saw axis, and which also removably receives the stud 15. The saw body 29 is substantially greater in diameter than the maximum diameter of the disintegrator 1, and integrally formed on the periphery of the saw body 29 and extending circumferentially therearound are spaced tooth backing elements 37. Saw teeth or tips 38 are brazed or otherwise rigidly secured to the respective backing elements 37. The tips 38 are preferably identical and may be formed of a suitable tungsten carbide steel. Each saw tooth 38 has its opposite side faces 39, 41 lying laterally outwardly respectively of the opposite sides 31, 33 of the saw body 29. Each saw tooth 38 also has its front face presented toward the adjacent forward backing element 37, and the front face has two surfaces 43, 45 that intersect respectively the side faces 39, 41 to form cutting edges 47, 49 laterally outwardly of the sides 31, 33, the cutting edges 47, 49 defining opposed surfaces of revolution that constitute the kerf of the saw. The two front face surfaces 43, 45 lie substantially in planes that interesect substantially at the midplane of each tooth and form an included obtuse angle, best seen in FIG. 3, and the line of intersection of the surfaces 43, 45 lies circumferentially intermediate the cutting edges 47, 49 and the backing element of the tooth. Consequently, acute shear face angles are formed at each side of the saw tooth.

An axially extending spacer is disposed about the axis of the saw arbor 11 and is interposed between the disintegrator body side 5 and the saw body 29. Preferably this spacer is in the form of a boss 51 that is integral with the disintegrator body 3, and projects axially from the side 5, terminating in an axially presented shoulder 53 that fits flush against the saw body side 31. Preferably also the boss 51 extends radially from the hole 9 and is in a diameter approximately the same as that of the arbor abutment 13.

A collar 55 is removably mounted on the arbor stud 15, and may be of approximately the same diameter as that of the boss 51. A nut 57 threads onto the stud 15, whereby the disintegrator 1 and saw 27 are firmly clamped onto the arbor between the collar 55 and arbor abutment 13.

It will be seen that the boss 51 provides a space 58 between the saw body 27 and the side 5 of the disintegrator body radially outwardly of the boss 51, and the axial clamping forces that hold the saw and disintegrator bodies onto the arbor 11 will be transmitted between the two bodies through the boss 51. Therefore, the bodies are firmly held onto the arbor while at the same time the fact that the disintegrator is out of contact with the saw radially outwardly of the boss 51 prevents the disintegrator from axially distorting the saw in its radially outer region, which might otherwise occur if the saw were in engagement with the outer peripheral part of the distintegrator. This would tend to prevent the saw from running true. The boss 51 may have whatever axial thickness is necessary to space the two bodies. Bosses in the order of .010 to .015 and about six inches in diameter have been found satisfactory with disintegrators having a ten inch nominal diameter and used with saws having a twelve inch nominal diameter.

When the assembled saw and disintegrator are used in the cutting of stock material 59, such as gypsum board, the trim or waste strip 60 is broken up into small particles by the shear-cutting action of the teeth 19, whereupon the particles may be easily collected by a suitable blower (not shown).

The disintegrator may also have teeth or tips 19', such as shown in FIGS. 4 and 5. The teeth 19' are similar to the teeth 19 except each of the teeth 19' has a rearwardly extending flange 62. The flange 62 has a shoulder 64 that is in flush, face-wise contact with the side 7 and is brazed thereto at the tooth backing element 17. This provides a means by which brazed interfaces of the tooth and disintegrator body is substantially increased over that between the forwardly presented face of the backing element and associated tooth, and thereby helps to insure retention of the teeth on the disintegrator body.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A scrap disintegrator for use with a circular saw, said scrap disintegrator comprising an annular body having means for mounting the body on an arbor, circumferentially spaced tooth backing elements on the periphery of the body, a carbide scrap-disintegrating tooth secured to each backing element and projecting laterally beyond only one side of the body and said one side being the same for all teeth, the teeth having cutting edges that form a surface of revolution and front faces that intersect the respective cutting edges to form an acute shear face angle on each tooth, and annular boss of smaller diameter than the minimum diameter of the backing elements and surrounding said mounting means, said boss projecting axially from the other side of the body and being of such axial length as to constitute a spacer to prevent contact of the peripheral part of the body and the adjacent part of the saw when the two are mounted on a saw arbor next to each other and drawn tightly together.

2. A scrap disintegrator according to claim 1 wherein the teeth have flanges that abut said one side of the body to resist axial forces imposed against the teeth.

3. In combination, a saw arbor, a scrap disintegrator that includes an annular body mounted on the arbor, said body having a diameter substantially in excess of the diameter of said arbor, circumferentially spaced scrap-disintegrating teeth on the periphery of said body and projecting outwardly from one side of said body, a circular saw mounted on the arbor adjacent to the scrap disintegrator, said saw having a body the diameter of which is greater than the maximum diameter of the scrap disintegrator, circumferentially spaced saw teeth on the periphery of the saw body, axially extending spacer means disposed about the axis of rotation of the arbor and interposed between the saw body and the other side of the disintegrator body, and cooperating means for removably securing the saw body and disintegrator body onto the arbor and which means in secured position applies axial clamping forces that are transmitted between the saw body and said other side of the distintegrator body through the spacer means, the radially outermost part of said spacer means being a substantial distance radially inwardly of the periphery of the disintegrator body, said spacer means having sufficient axial width to separate axially the saw and the disintegrator in that region between the two that is radially outwardly of said spacer means, the adjacent sides of the saw and disintegrator body being of such configuration that they would otherwise abut except for said spacer means, whereby the transmission of axial clamping forces and possible distortion of the saw body therefrom in said region is prevented.

4. The combination according to claim 3 wherein the scrap disintegrator teeth have ends that are approximately flush with said other side of the disintegrator body.

5. The combination according to claim 3 wherein the spacer means is integral with the disintegrator body.

6. The combination according to claim 3 wherein said cooperating means includes opposed axially presented shoulders, the radially outermost parts of which coincide approximately with the radially outermost part of the spacer means.

References Cited by the Examiner

UNITED STATES PATENTS

| 8,393 | 9/51 | Woolston | 143—140 |
|---|---|---|---|
| 392,126 | 10/88 | Lemke | 241—277 |
| 2,592,382 | 4/52 | Blais | 144—237 X |
| 2,857,111 | 10/58 | Clark | 241—294 |
| 2,865,572 | 12/58 | Lannert | 241—294 |
| 3,027,106 | 3/62 | Brooks | 241—294 |

J. SPENCER OVERHOLSER, *Primary Examiner.*

WILLIAM W. DYER, JR., *Examiner.*